(12) United States Patent
Park et al.

(10) Patent No.: US 10,234,167 B2
(45) Date of Patent: Mar. 19, 2019

(54) AIR CONDITIONER APPARATUS WITH PARTITIONED SUCTION AND DISCHARGE CHANNELS

(71) Applicant: LG ELECTRONICS INC., Seoul (KR)

(72) Inventors: Sangil Park, Seoul (KR); Doyong Ha, Seoul (KR); Yoonho Yoo, Seoul (KR); Taehee Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 469 days.

(21) Appl. No.: 14/993,974

(22) Filed: Jan. 12, 2016

(65) Prior Publication Data

US 2016/0201937 A1 Jul. 14, 2016

(30) Foreign Application Priority Data

Jan. 12, 2015 (KR) .................. 10-2015-0004412

(51) Int. Cl.
*F24F 12/00* (2006.01)

(52) U.S. Cl.
CPC ............. *F24F 12/003* (2013.01); *Y02B 30/52* (2013.01); *Y02B 30/563* (2013.01)

(58) Field of Classification Search
CPC ...... F24F 7/00; F24F 7/007; F24F 7/06; F24F 7/08; F24F 2007/001; F24F 12/003; F24F 3/147; F24F 2011/0002; F24F 13/08; F24F 13/10; F24F 2013/088
See application file for complete search history.

(56) References Cited

U.S. PATENT DOCUMENTS

| | | | | |
|---|---|---|---|---|
| 2,468,626 A | * | 4/1949 | Graham | F24F 3/001 165/240 |
| 4,477,020 A | * | 10/1984 | Makara | F24D 5/02 236/46 R |
| 4,655,278 A | * | 4/1987 | Seguin | F24F 3/001 165/48.1 |

(Continued)

FOREIGN PATENT DOCUMENTS

| | | |
|---|---|---|
| EP | 2 264 375 A3 | 6/2014 |
| JP | 2005-164148 A | 6/2005 |
| KR | 1020000000196 A | 1/2000 |

*Primary Examiner* — Travis C Ruby
(74) *Attorney, Agent, or Firm* — Dentons US LLP (57) ABSTRACT

An air conditioner including a suction channel module having a suction module housing with a first and a second suction channel provided therein, and a suction connection channel to guide air between the first and second suction channels; a discharge channel module having a discharge module housing with a first and a second discharge channel provided therein, and a discharge connection channel to guide air between the first and second discharge channels; a first heat exchanger disposed between the first suction channel and the first discharge channel to exchange heat with air that passed through the first suction channel and operate as one of a condenser and an evaporator; and a second heat exchanger disposed between the second suction channel and the second discharge channel to exchange heat with air that passed through the second suction channel and operate as the other of the condenser and the evaporator.

20 Claims, 9 Drawing Sheets

(56) References Cited

U.S. PATENT DOCUMENTS

| | | | | |
|---|---|---|---|---|
| 4,677,904 A | * | 7/1987 | Natsumeda | F15D 1/08 454/266 |
| 4,841,733 A | * | 6/1989 | Dussault | F24F 5/0071 62/93 |
| 4,995,307 A | * | 2/1991 | Floyd | F24F 3/044 454/299 |
| 2005/0167077 A1 | * | 8/2005 | Matsugi | F04D 17/105 165/4 |
| 2011/0287706 A1 | * | 11/2011 | Maughan | F24F 13/08 454/329 |

* cited by examiner

AIR CONDITIONER APPARATUS WITH PARTITIONED SUCTION AND DISCHARGE CHANNELS

CROSS-REFERENCE TO RELATED APPLICATION

This application claims the priority benefit of Korean Patent Application No. 10-2015-0004412, filed on Jan. 12, 2015 in the Korean Intellectual Property Office, the disclosure of which is incorporated herein by reference.

BACKGROUND OF THE INVENTION

1. Field of the Invention

The present invention relates to an air conditioner apparatus.

2. Description of the Related Art

In general, an air conditioner apparatus is an apparatus that discharges contaminated indoor air and suctions fresh and clean outdoor air such that the outdoor air can be supplied to the indoors.

An air conditioner apparatus having no ventilation function cools or heats indoor air while circulating the indoor air.

An air conditioner apparatus having no outdoor air introduced therein filters indoor air using a filter or the like. In a case in which air conditioning is performed using only the indoor air, however, the quality of the indoor air is gradually deteriorated.

In recent years, an air conditioner apparatus that is capable of suctioning outdoor air and discharging indoor air has been installed and used.

An example of such a conventional air conditioner apparatus is disclosed in Korean Patent Application Publication No. 10-2010-0128812.

SUMMARY OF THE INVENTION

Therefore, the present invention has been made in view of the above problems, and it is an object of the present invention to provide an air conditioner apparatus that is capable of enabling air to exchange heat with a heat exchanger while contacting the entire surface of the heat exchanger.

In accordance with an aspect of the present invention, the above and other objects can be accomplished by the provision of an air conditioner apparatus including a suction channel module including a suction module housing, a first suction channel defined in the suction module housing, a second suction channel defined in the suction module housing, and a suction connection channel connected between the first suction channel and the second suction channel for guiding air, a discharge channel module including a discharge module housing for receiving air from the suction module housing, a first discharge channel defined in the discharge module housing, a second discharge channel defined in the discharge module housing, and a discharge connection channel connected between the first discharge channel and the second discharge channel for guiding air, a first heat exchanger disposed between the first suction channel and the first discharge channel for exchanging heat with air having passed through the first suction channel, the first heat exchanger being operated as one selected from between a condenser and an evaporator, and a second heat exchanger disposed between the second suction channel and the second discharge channel for exchanging heat with air having passed through the second suction channel, the second heat exchanger being operated as the other selected from between the condenser and the evaporator.

The first suction channel may be provided therein with a channel partition plate for partitioning the first suction channel into a 1-1 suction channel, disposed above the channel partition plate, and a 1-2 suction channel, disposed under the channel partition plate, and the second suction channel may be provided therein with a channel partition plate for partitioning the second suction channel into a 2-1 suction channel, disposed above the channel partition plate, and a 2-2 suction channel, disposed under the channel partition plate.

The suction connection channel may include a first suction connection channel connected between the 1-1 suction channel and the 2-1 suction channel and a second suction connection channel connected between the 1-2 suction channel and the 2-2 suction channel.

The air conditioner apparatus may further include a first suction damper for selectively opening and closing one selected from between the first suction connection channel and the first suction channel and a second suction damper for selectively opening and closing one selected from between the second suction connection channel and the second suction channel.

The first suction connection channel and the second suction connection channel may be inclined, and the first suction connection channel and the second suction connection channel may intersect each other while being disposed one above the other.

The first discharge channel may be provided therein with a channel partition plate for partitioning the first discharge channel into a 1-1 discharge channel, disposed above the channel partition plate, and a 1-2 discharge channel, disposed under the channel partition plate, and the second discharge channel may be provided therein with a channel partition plate for partitioning the second discharge channel into a 2-1 discharge channel, disposed above the channel partition plate, and a 2-2 discharge channel, disposed under the channel partition plate.

The discharge connection channel may include a first discharge connection channel connected between the 1-1 discharge channel and the 2-1 discharge channel and a second discharge connection channel connected between the 1-2 discharge channel and the 2-2 discharge channel.

The air conditioner apparatus may further include a first discharge damper for selectively opening and closing one selected from between the first discharge connection channel and the first discharge channel and a second discharge damper for selectively opening and closing one selected from between the second discharge connection channel and the second discharge channel.

The first discharge connection channel and the second discharge connection channel may be inclined, and the first discharge connection channel and the second discharge connection channel may intersect each other while being disposed one above the other.

The first heat exchanger may be disposed over the 1-1 suction channel and the 1-2 suction channel, which are disposed one above the other.

The second heat exchanger may be disposed over the 2-1 suction channel and the 2-2 suction channel, which are disposed one above the other.

The air conditioner apparatus may further include a first heat exchanger housing connected between the first suction channel and the first discharge channel for guiding air, wherein the first heat exchanger may be installed in the first heat exchanger housing.

The air conditioner apparatus may further include a second heat exchanger housing connected between the second suction channel and the second discharge channel for guiding air, wherein the second heat exchanger may be installed in the second heat exchanger housing.

The first suction channel, the first heat exchanger, and the first discharge channel may be arranged in a line.

The second suction channel, the second heat exchanger, and the second discharge channel may be arranged in a line.

The first heat exchanger may have a larger sectional area than the first suction channel.

The second heat exchanger may have a larger sectional area than the second suction channel.

The first suction channel may be connected to the outdoors for suctioning air, the first discharge channel may be connected to the outdoors for discharging air, the second suction channel may be connected to the indoors for suctioning air, and the second discharge channel may be connected to the indoors for discharging air.

In accordance with another aspect of the present invention, there is provided an air conditioner apparatus including a suction channel module including a suction module housing, a first suction channel defined in the suction module housing, a second suction channel defined in the suction module housing, and a suction connection channel connected between the first suction channel and the second suction channel for guiding air, a discharge channel module including a discharge module housing for receiving air from the suction module housing, a first discharge channel defined in the discharge module housing, a second discharge channel defined in the discharge module housing, and a discharge connection channel connected between the first discharge channel and the second discharge channel for guiding air, a first heat exchanger disposed between the first suction channel and the first discharge channel for exchanging heat with air having passed through the first suction channel, the first heat exchanger being operated as one selected from between a condenser and an evaporator, and a second heat exchanger disposed between the second suction channel and the second discharge channel for exchanging heat with air having passed through the second suction channel, the second heat exchanger being operated as the other selected from between the condenser and the evaporator, wherein the first suction channel is provided therein with a channel partition plate for partitioning the first suction channel into a 1-1 suction channel, disposed above the channel partition plate, and a 1-2 suction channel, disposed under the channel partition plate, the second suction channel is provided therein with a channel partition plate for partitioning the second suction channel into a 2-1 suction channel, disposed above the channel partition plate, and a 2-2 suction channel, disposed under the channel partition plate, the suction connection channel includes a first suction connection channel connected between the 1-1 suction channel and the 2-1 suction channel and a second suction connection channel connected between the 1-2 suction channel and the 2-2 suction channel, the first discharge channel is provided therein with a channel partition plate for partitioning the first discharge channel into a 1-1 discharge channel, disposed above the channel partition plate, and a 1-2 discharge channel, disposed under the channel partition plate, the second discharge channel is provided therein with a channel partition plate for partitioning the second discharge channel into a 2-1 discharge channel, disposed above the channel partition plate, and a 2-2 discharge channel, disposed under the channel partition plate, the discharge connection channel includes a first discharge connection channel connected between the 1-1 discharge channel and the 2-1 discharge channel and a second discharge connection channel connected between the 1-2 discharge channel and the 2-2 discharge channel, the first heat exchanger is disposed over the 1-1 suction channel and the 1-2 suction channel, disposed one above the other, the first heat exchanger having a larger sectional area than the first suction channel, and the second heat exchanger is disposed over the 2-1 suction channel and the 2-2 suction channel, disposed one above the other, the second heat exchanger having a larger sectional area than the second suction channel.

The first suction channel, the first heat exchanger, and the first discharge channel may be arranged in a line, the second suction channel, the second heat exchanger, and the second discharge channel may be arranged in a line, the first suction channel may be connected to the outdoors for suctioning air, the first discharge channel may be connected to the outdoors for discharging air, the second suction channel may be connected to the indoors for suctioning air, and the second discharge channel may be connected to the indoors for discharging air.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

The present invention will be described in detail with reference to the accompanying drawings.

In the following description of the present invention, a detailed description of known functions or configurations incorporated herein will be omitted when it may make the subject matter of the present invention rather unclear. The same terms may be denoted by different reference numerals if the terms indicate different parts.

The terms used in the following description are terms defined taking into consideration the functions obtained in accordance with the present invention. The definitions of these terms should be determined based on the whole content of this specification because they may be changed in accordance with the intentions of users, such as experimenters and measurers, or usual practices.

In this specification, the terms "first," "second," etc. are used to describe various elements. However, the elements are not limited by the terms. The terms are used only to distinguish one element from another element. For example, a first element may be named a second element, and a second element may be named a first element, without departing from the scope of right of the present invention. It will be understood that the term "and/or" refers to one or more possible combinations of specified relevant items and includes such combinations.

The terms used in this specification are provided only to explain specific embodiments, but are not intended to restrict the present invention. A singular representation may include a plural representation unless it represents a definitely different meaning from the context.

Unless otherwise defined, all terms, including technical and scientific terms, used in this specification have the same meaning as commonly understood by a person having ordinary skill in the art to which the present invention pertains. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, the terms "comprises" and "includes" described herein should be interpreted not to exclude other elements but to further include such other elements since the corresponding elements may be inherent unless mentioned otherwise.

Figure 1:
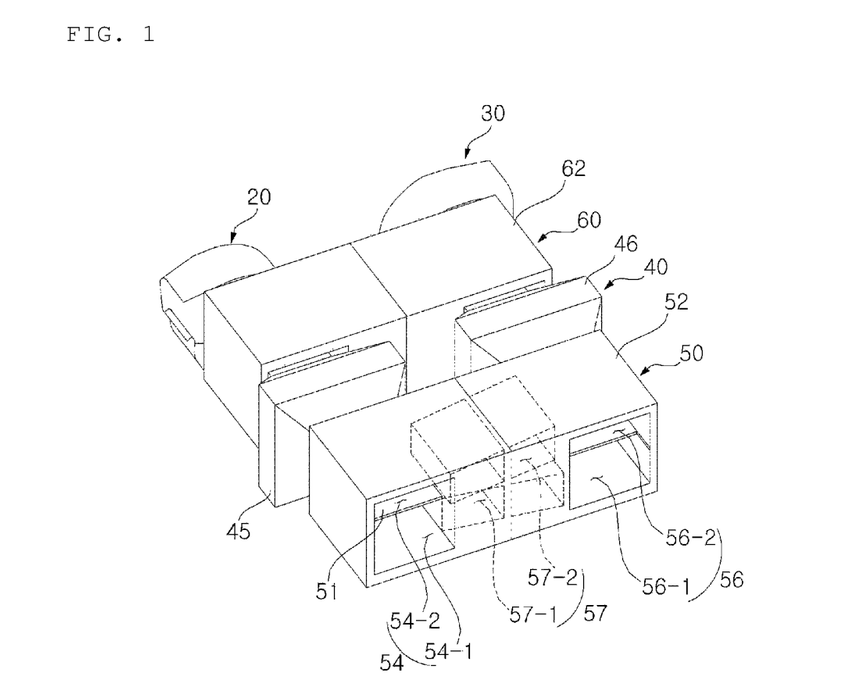
FIG. 1 is a perspective view showing an air conditioner apparatus according to a first embodiment of the present invention.
Figure 2:
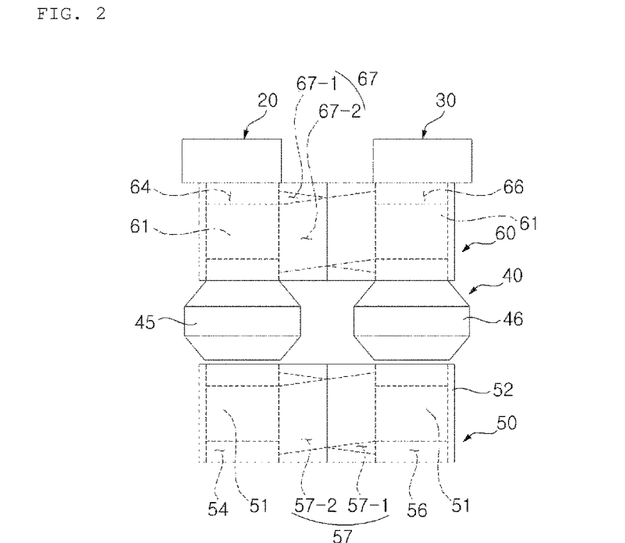
FIG. 2 is a plan view of FIG. 1.
Figure 3:
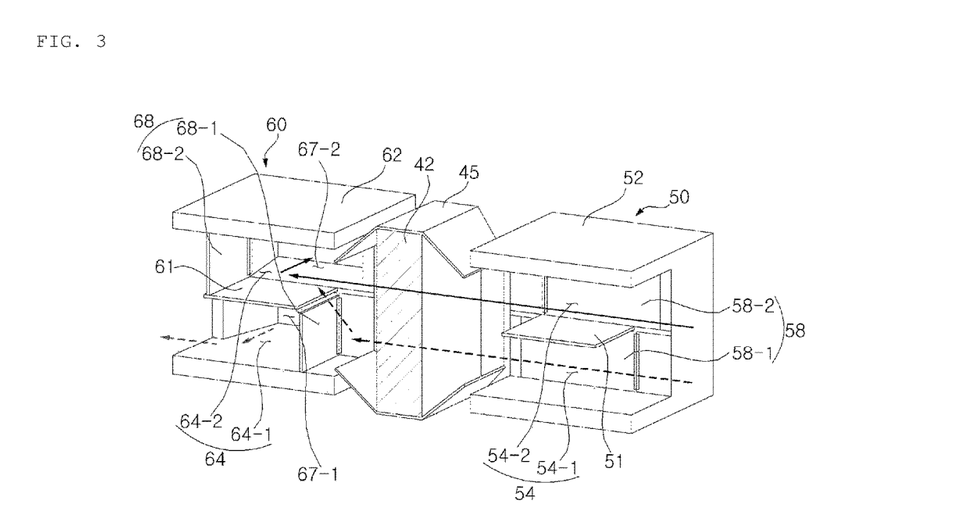
FIG. 3 is a view showing an example of the outdoor-side operation structure of a suction damper and a discharge damper of the air conditioner apparatus according to the first embodiment of the present invention.
Figure 4:
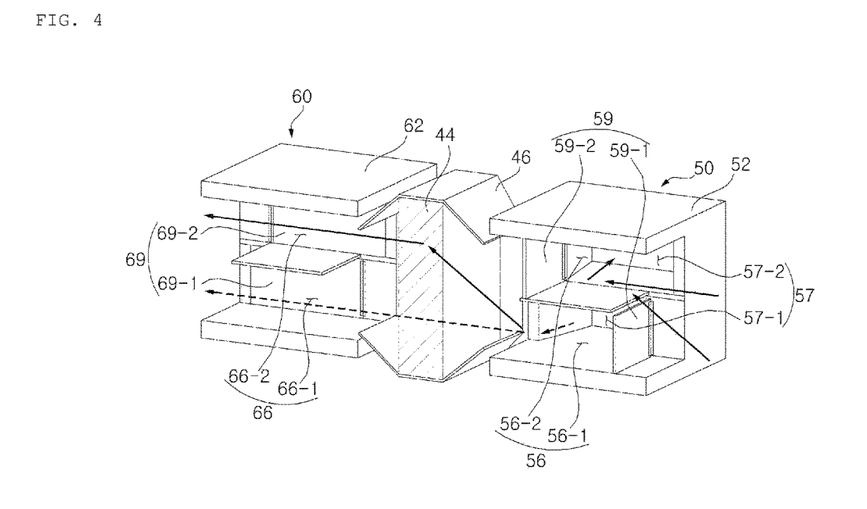
FIG. 4 is a view showing an example of the indoor-side operation structure of the suction damper and the discharge damper of the air conditioner apparatus according to the first embodiment of the present invention.

FIG. 1 is a perspective view showing an air conditioner apparatus according to a first embodiment of the present invention, FIG. 2 is a plan view of FIG. 1, FIG. 3 is a view showing an example of the outdoor-side operation structure of a suction damper and a discharge damper of the air conditioner apparatus according to the first embodiment of the present invention, and FIG. 4 is a view showing an example of the indoor-side operation structure of the suction damper and the discharge damper of the air conditioner apparatus according to the first embodiment of the present invention.

Referring to the drawings, the air conditioner apparatus according to this embodiment includes a suction channel module 50 for suctioning air, a discharge channel module 60 for discharging the air suctioned through the suction channel module 50, an outdoor discharge fan 20 installed in the discharge channel module 60 for discharging the suctioned air outdoors, an indoor discharge fan 30 installed in the discharge channel module 60 for discharging the suctioned air indoors, and an air conditioning unit 40 disposed between the suction channel module 50 and the discharge channel module 60 for conditioning the air that flows in the suction channel module 50 and the discharge channel module 60.

The suction channel module 50 includes a suction module housing 52, a first suction channel 54 defined in the suction module housing 52, a second suction channel 56 defined in the suction module housing 52, a suction connection channel 57 connected between the first suction channel 54 and the second suction channel 56, a first suction damper 58 disposed in the first suction channel 54 for guiding air to the first suction channel 54 or to the suction connection channel 57, and a second suction damper 59 disposed in the second suction channel 56 for guiding air to the second suction channel 56 or the suction connection channel 57.

In this embodiment, the first suction channel 54 and the second suction channel 56 are disposed parallel to each other.

The first suction channel 54 includes a 1-1 suction channel 54-1, which constitutes the lower part of the first suction channel 54, and a 1-2 suction channel 54-2, which constitutes the upper part of the first suction channel 54. The 1-1 suction channel 54-1 and the 1-2 suction channel 54-2 are partitioned by a channel partition plate 51 such that the 1-1 suction channel 54-1 is located under the 1-2 suction channel 54-2.

The second suction channel 56 also includes a 2-1 suction channel 56-1, which constitutes the lower part of the second suction channel 56, and a 2-2 suction channel 56-2, which constitutes the upper part of the second suction channel 56. The 2-1 suction channel 56-1 and the 2-2 suction channel 56-2 are partitioned by the channel partition plate 51 such that the 2-1 suction channel 56-1 is located under the 2-2 suction channel 56-2.

The suction connection channel 57 includes a first suction connection channel 57-1 connected between the 1-1 suction channel 54-1 and the 2-1 suction channel 56-1 and a second suction connection channel 57-2 connected between the 1-2 suction channel 54-2 and the 2-2 suction channel 56-2.

The first suction connection channel 57-1 and the second suction connection channel 57-2 are inclined in consideration of a direction in which air flows.

The first suction damper 58 includes a 1-1 suction damper 58-1 installed in the 1-1 suction channel 54-1 and a 1-2 suction damper 58-2 installed in the 1-2 suction channel 54-2.

The 1-1 suction damper 58-1 is installed in the suction module housing 52. The 1-1 suction damper 58-1 opens one selected from between the 1-1 suction channel 54-1 and the first suction connection channel 57-1 and closes the other selected from between the 1-1 suction channel 54-1 and the first suction connection channel 57-1.

The 1-2 suction damper 58-2 is also installed in the suction module housing 52. The 1-2 suction damper 58-2 opens one selected from between the 1-2 suction channel 54-2 and the second suction connection channel 57-2 and closes the other selected from between the 1-2 suction channel 54-2 and the second suction connection channel 57-2.

The first suction damper 58 is installed vertically in the suction module housing 52 such that the first suction damper 58 can rotate in a horizontal direction. As the result of the rotation of the first suction damper 58, one selected from between the first suction channel 54 and the suction connection channel 57 is opened, and the other selected from between the first suction channel 54 and the suction connection channel 57 is closed.

The second suction damper 59 is formed so as to have the same structure as the first suction damper 58. The second suction damper 59 includes a 2-1 suction damper 59-1 and a 2-2 suction damper 59-2.

In this embodiment, the first suction channel 54 is connected to the outdoors such that outdoor air is suctioned through the first suction channel 54, and the second suction channel 56 is connected to the indoors such that indoor air is suctioned through the second suction channel 56.

In addition, the discharge channel module 60 is formed so as to have the same structure as the suction channel module 50.

The suction channel module 50 and the discharge channel module 60 are identical in structure to each other. The suction channel module 50 and the discharge channel module 60 are different from each other only in that the suction channel module 50 is provided to suction air and the discharge channel module 60 is provided to discharge air.

The discharge channel module 60 includes a discharge module housing 62.

The discharge channel module 60 further includes a first discharge channel 64, which includes a 1-1 discharge channel 64-1 and a 1-2 discharge channel 64-2, a second discharge channel 66, which includes a 2-1 discharge channel 66-1 and a 2-2 discharge channel 66-2, a discharge connection channel 67, which includes a first discharge connection channel 67-1 and a second discharge connection channel 67-2, a first discharge damper 68, which includes a 1-1 discharge damper 68-1 and a 1-2 discharge damper 68-2, and a second discharge damper 69, which includes a 2-1 discharge damper 69-1 and a 2-2 discharge damper 69-2.

In the first discharge channel 64 is disposed a channel partition plate 61 for partitioning the space in the first discharge channel 64 into the upper and lower parts. In addition, the channel partition plate 61 is also disposed in the second discharge channel 66.

In this embodiment, the first discharge channel 64 is connected to the outdoors such that air is guided to the outdoors through the first discharge channel 64, and the second discharge channel 66 is connected to the indoors such that air is guided to the indoors through the second suction channel 56.

Referring to FIG. 2, the first suction channel 54 and the first discharge channel 64, which are located at the left side of the figure, are connected to the outdoors, and the second suction channel 56 and the second discharge channel 66, which are located at the left side of the figure, are connected to the indoors.

The air conditioning unit 40 includes a compressor (not shown), an expansion valve (not shown), a four-way valve (not shown), a first heat exchanger 42, and a second heat exchanger 44, which constitute a heat pump cycle. Although not shown, the compressor, the expansion valve, and the four-way valve may be disposed between the first heat exchanger 42 and the second heat exchanger 44.

The first heat exchanger 42 and the second heat exchanger 44 are installed vertically over the two-story suction channels.

Regardless of whether air is introduced through the 1-1 suction channel 54-1 or the 1-2 suction channel 54-2, therefore, the air may exchange heat with the entire surface of the first heat exchanger 42 or the second heat exchanger 44.

In the same manner, regardless of whether air is introduced through the 2-1 suction channel 56-1 or the 2-2 suction channel 56-2, therefore, the air may exchange heat with the entire surface of the first heat exchanger 42 or the second heat exchanger 44.

That is, even when air is introduced through only one story of each of the two-story suction channels, the air exchanges heat with the entire surface of the first heat exchanger 42 or the second heat exchanger 44, which is installed vertically over a corresponding one of the two-story suction channels.

In this embodiment, the first heat exchanger 42 or the second heat exchanger 44 are used in common for the multiple channels as defined above.

The first heat exchanger 42 may function as an evaporator or a condenser. The surface of the first heat exchanger 42 is coated with a desiccant material such that moisture clings to the surface of the first heat exchanger 42.

The second heat exchanger 44 may function as a condenser or an evaporator, and may be unlike the first heat exchanger 42. The surface of the second heat exchanger 44 is also coated with a desiccant material such that moisture clings to the surface of the second heat exchanger 44.

The desiccant material is a material that is capable of absorbing moisture from the air and discharging the absorbed moisture into the air when heat is applied to the desiccant material. The desiccant material is well known to those skilled in the art, and therefore a detailed description thereof will be omitted.

In this embodiment, the first and second heat exchangers 42 and 44 are alternately used as condensers or evaporators according to the heat pump cycle. When the first and second heat exchangers 42 and 44 are used as evaporators, the first and second heat exchangers 42 and 44 absorb moisture. When the first and second heat exchangers 42 and 44 are used as condensers, on the other hand, the first and second heat exchangers 42 and 44 discharge absorbed moisture into the air.

In this embodiment, the first heat exchanger 42 is disposed in a first heat exchanger housing 45, and the second heat exchanger 44 is disposed in a second heat exchanger housing 46.

The first heat exchanger housing 45 is connected between the first suction channel 54 and the first discharge channel 64. The second heat exchanger housing 46 is connected between the second suction channel 56 and the second discharge channel 66.

Air flowing from the suction channel module 50 to the discharge channel module 60 passes through the first heat exchanger housing 45 or the second heat exchanger housing 46. At this time, the air exchanges heat with the first heat exchanger 42, which is disposed in the first heat exchanger housing 45, or the second heat exchanger 44, which is disposed in the second heat exchanger housing 46.

Hereinafter, the operation of the air conditioner apparatus according to the first embodiment of the present invention will be described in detail.

Figure 5:
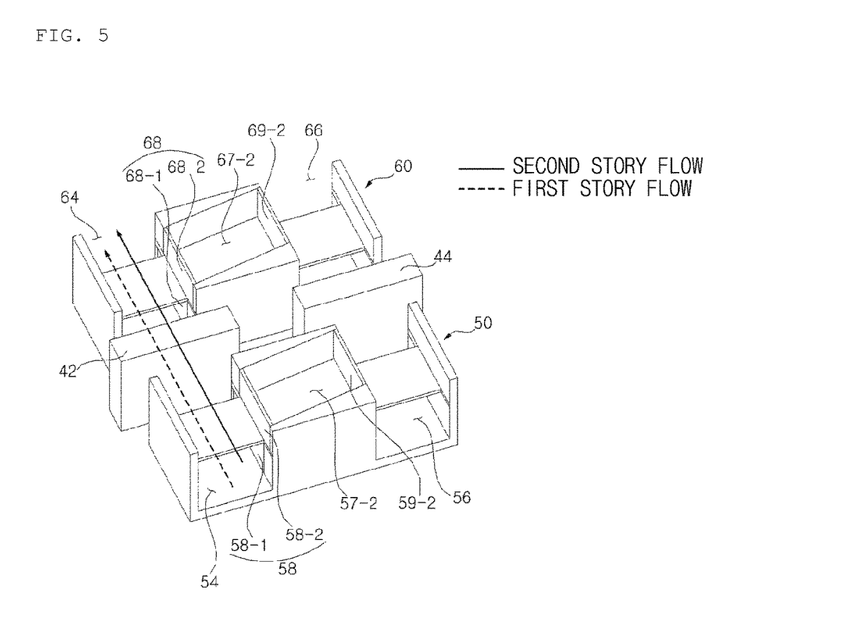
FIG. 5 is a view showing a first example of the flow of air during the outdoor suction and outdoor discharge by the air conditioner apparatus according to the first embodiment of the present invention.
Figure 6:
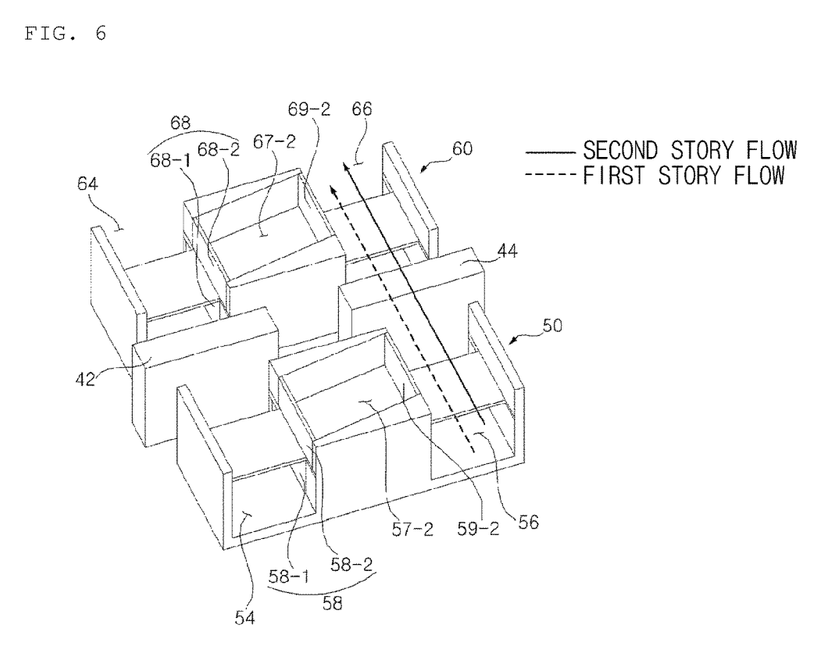
FIG. 6 is a view showing a first example of the flow of air during the indoor suction and indoor discharge by the air conditioner apparatus according to the first embodiment of the present invention.
Figure 7:
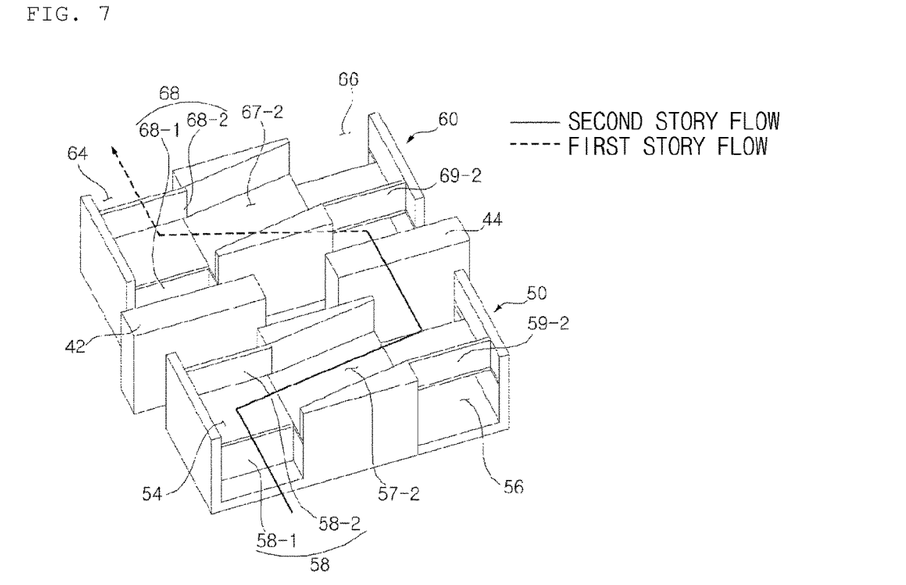
FIG. 7 is a view showing a second example of the flow of air during the outdoor suction and outdoor discharge by the air conditioner apparatus according to the first embodiment of the present invention.
Figure 8:
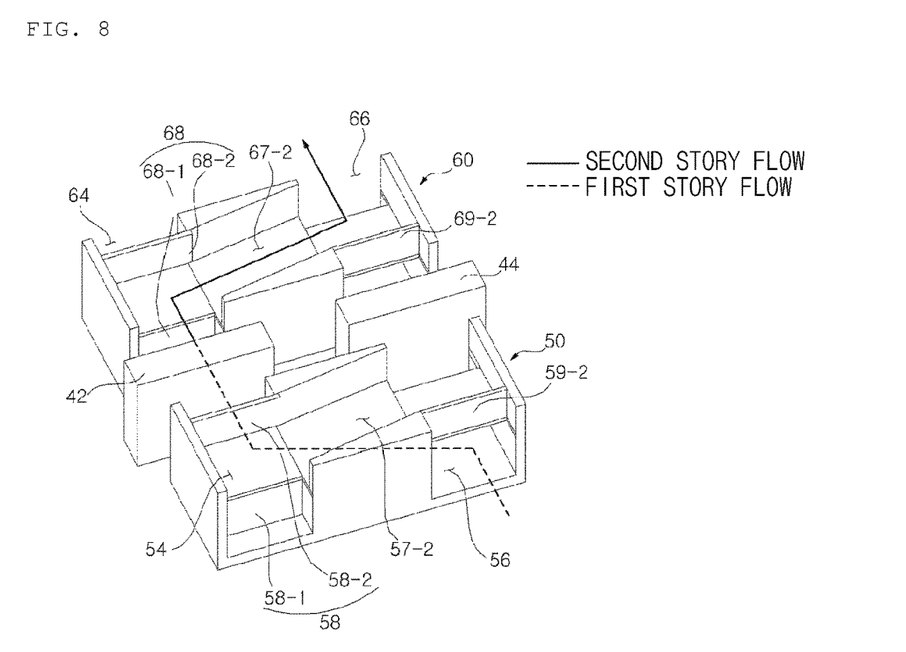
FIG. 8 is a view showing a second example of the flow of air during the indoor suction and indoor discharge by the air conditioner apparatus according to the first embodiment of the present invention.
Figure 9:
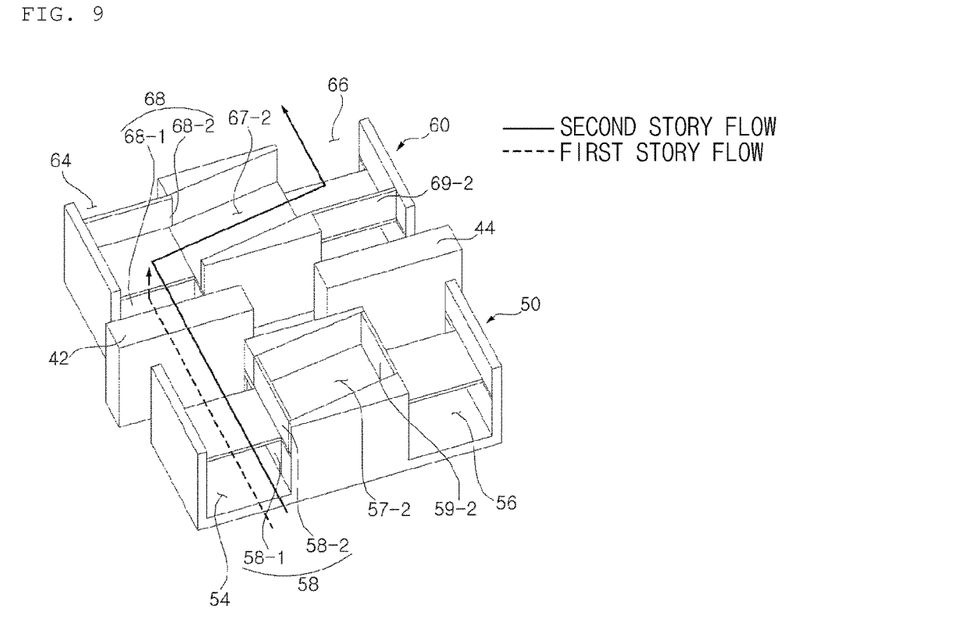
FIG. 9 is a view showing a first example of the flow of air during the outdoor suction and indoor discharge by the air conditioner apparatus according to the first embodiment of the present invention.
Figure 10:
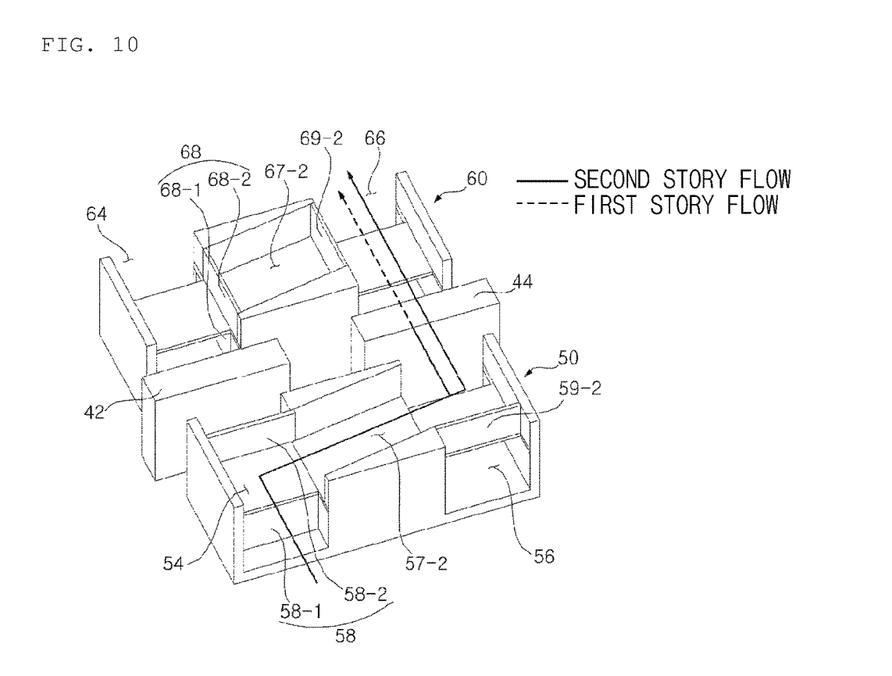
FIG. 10 is a view showing a second example of the flow of air during the outdoor suction and indoor discharge by the air conditioner apparatus according to the first embodiment of the present invention.
Figure 11:
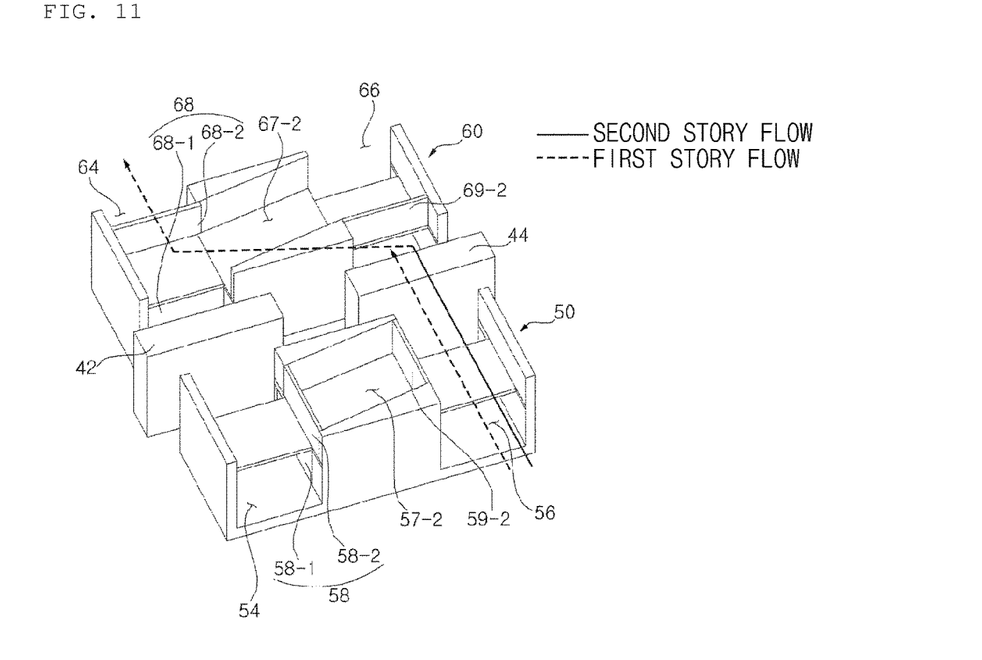
FIG. 11 is a view showing a first example of the flow of air during the indoor suction and outdoor discharge by the air conditioner apparatus according to the first embodiment of the present invention.
Figure 12:
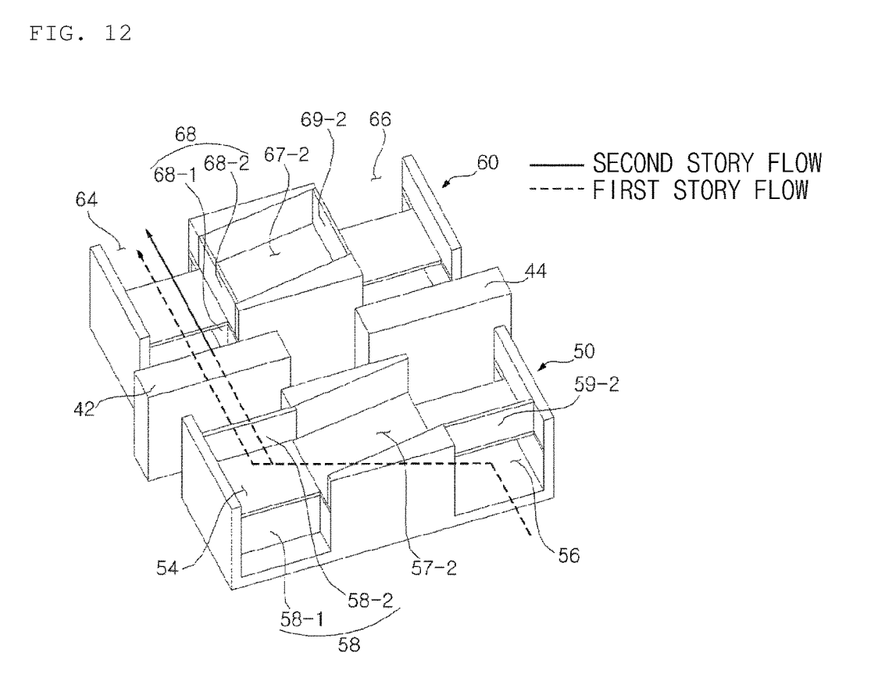
FIG. 12 is a view showing a second example of the flow of air during the indoor suction and outdoor discharge by the air conditioner apparatus according to the first embodiment of the present invention.

FIG. 5 is a view showing a first example of the flow of air during the outdoor suction and outdoor discharge by the air conditioner apparatus according to the first embodiment of the present invention, FIG. 6 is a view showing a first example of the flow of air during the indoor suction and indoor discharge by the air conditioner apparatus according to the first embodiment of the present invention, FIG. 7 is a view showing a second example of the flow of air during the outdoor suction and outdoor discharge by the air conditioner apparatus according to the first embodiment of the present invention, FIG. 8 is a view showing a second example of the flow of air during the indoor suction and indoor discharge by the air conditioner apparatus according to the first embodiment of the present invention, FIG. 9 is a view showing a first example of the flow of air during the outdoor suction and indoor discharge by the air conditioner apparatus according to the first embodiment of the present invention, FIG. 10 is a view showing a second example of the flow of air during the outdoor suction and indoor discharge by the air conditioner apparatus according to the first embodiment of the present invention, FIG. 11 is a view showing a first example of the flow of air during the indoor suction and outdoor discharge by the air conditioner apparatus according to the first embodiment of the present invention, and FIG. 12 is a view showing a second example of the flow of air during the indoor suction and outdoor discharge by the air conditioner apparatus according to the first embodiment of the present invention.

First, a circulation mode, in which air suctioned from the outdoors is discharged to the outdoors and air suctioned from the indoors is discharged to the indoors, will be described in detail. The circulation mode is shown in FIGS. 5 to 8.

In the circulation mode, a course along which indoor air passes through the first heat exchanger 42 and a course along which indoor air passes through the second heat exchanger 44 are defined.

The circulation mode include a first circulation mode, in which air flows straight, and a second circulation mode, in which air passes through the suction connection channel 57 or the discharge connection channel 67.

In the first circulation mode, the air in the first suction channel 54 flows to the first discharge channel 64 and the air in the second suction channel 56 flows to the second discharge channel 66.

In the first circulation mode, indoor air may be humidified or dehumidified. That is, a humidification mode or a dehumidification mode may be applied.

In the first circulation mode, the first suction damper 58 and the second suction damper 59 close the suction connection channel 57, and the first discharge damper 68 and the second discharge damper 69 close the discharge connection channel 67.

In the first circulation mode, indoor air and outdoor air flow straight. When the air flows straight, air resistance is minimized. At this time, the air uniformly exchanges heat with the entire surface of the first heat exchanger 42 or the second heat exchanger 44.

When the air exchanges heat with the first heat exchanger 42 or the second heat exchanger 44, the air does not exchange heat only with a portion of the first heat exchanger 42 or the second heat exchanger 44, but uniformly exchanges heat with the entire surface of the first heat exchanger 42 or the second heat exchanger 44, which are installed over the first and second stories of a corresponding one of the suction channels.

The flow of air during the outdoor suction and outdoor discharge by the air conditioner apparatus and during the indoor suction and indoor discharge by the air conditioner apparatus as described above may be summarized as follows using only reference numerals (the first circulation mode, shown in FIG. 5 or 6).

(1) The flow of air during the outdoor suction and outdoor discharge by the air conditioner apparatus

54->42->64

(2) The flow of air during the indoor suction and indoor discharge by the air conditioner apparatus

56->44->66

Meanwhile, in this embodiment, air may be guided to the suction connection channel 57 or the discharge connection channel 67 using the suction dampers 58 and 59 and the discharge dampers 68 and 69, whereby the first and second heat exchangers 42 and 44, which exchange heat with the air, may be alternately used.

The flow of air during the outdoor suction and outdoor discharge by the air conditioner apparatus and during the indoor suction and indoor discharge by the air conditioner apparatus using the suction connection channel 57 and the discharge connection channel 67 may be summarized as follows using only reference numerals (the second circulation mode, shown in FIG. 7 or 8).

(3) The flow of air during the outdoor suction and outdoor discharge by the air conditioner apparatus using the suction connection channel 57 and the discharge connection channel 67

54->57-2->44->66-1->67-1->64-1

(4) The flow of air during the indoor suction and indoor discharge by the air conditioner apparatus using the suction connection channel 57 and the discharge connection channel 67

56->57-1->42->64-2->67-2->66-2

Even when air flows through the connection channels 57 and 67, the air exchanges heat with the entire surface of the first heat exchanger 42 or the second heat exchanger 44.

In the second circulation mode, the air may flow between the stories of each of the channels.

During the outdoor suction and outdoor discharge or the indoor suction and indoor discharge by the air conditioner apparatus according to this embodiment, the second heat exchanger 44 may be operated as the evaporator when the first heat exchanger 42 is operated as the condenser, and the second heat exchanger 44 may be operated as the condenser when the first heat exchanger 42 is operated as the evaporator.

For example, in order to dehumidify indoor air, the second heat exchanger 44 is used as the evaporator in air flow course (2). After air flow course (2) is maintained for a predetermined period of time, moisture clings to the second heat exchanger 44, with the result that the dehumidification performance of the second heat exchanger 44 is reduced.

At this time, the operation mode of the air conditioning unit 40 is changed such that the second heat exchanger 44 operates as the condenser and the first heat exchanger 42 operates as the evaporator.

In this case, the air flow course is changed from air flow course (2) to air flow course (4) such that air suctioned from the indoors and discharged to the indoors exchanges heat with the first heat exchanger 42, which operates as the evaporator, whereby indoor air is continuously dehumidified.

On the other hand, in order to humidify indoor air, heat exchange may be carried out between air flowing into the indoors and the heat exchangers 42 and 44 operating as the condensers such that moisture is supplied to the air.

In this embodiment, a mode in which the straight channels are closed and connection channels 57 and 67 are opened using the dampers 58, 59, 68, and 69 is defined as a first mode.

On the other hand, a mode in which the straight channels are opened and connection channels 57 and 67 are closed using the dampers 58, 59, 68, and 69 is defined as a second mode.

The suction channel module 50 and the discharge channel module 60 may be operated in the first mode or in the second mode.

In air flow courses (1) and (2), both the suction channel module 50 and the discharge channel module 60 may be operated in the second mode. On the other hand, in air flow courses (3) and (4), both the suction channel module 50 and the discharge channel module 60 may be operated in the first mode.

Next, a ventilation mode, in which the outdoor suction and indoor discharge or the indoor suction and outdoor discharge by the air conditioner apparatus are carried out, will be described in detail.

In the ventilation mode, outdoor air is supplied to the indoors, and some indoor air is discharged to the outdoors, such that air-conditioned air, i.e. fresh air, is supplied to the indoors.

In this embodiment, therefore, during the outdoor suction and indoor discharge by the air conditioner apparatus, outdoor air is suctioned through the first suction channel 54, and then air is discharged through the second discharge channel 66.

In addition, during the indoor suction and outdoor discharge by the air conditioner apparatus, indoor air is suctioned through the second suction channel 56, and then air is discharged through the first discharge channel 64.

Both during the outdoor suction and indoor discharge by the air conditioner apparatus and during the indoor suction and outdoor discharge by the air conditioner apparatus, air flows through the connection channels, and two courses may be selected in each case.

In the ventilation mode according to this embodiment, air passes through at least one selected from between the suction connection channel 57 and the discharge connection channel 67.

The flow of air during the outdoor suction and indoor discharge by the air conditioner apparatus and during the indoor suction and outdoor discharge by the air conditioner apparatus as described above may be summarized as follows using only reference numerals.

(5) The flow of air during the outdoor suction and indoor discharge by the air conditioner apparatus
54->42->64-2->67-2->66-2

(6) The flow of air during the outdoor suction and indoor discharge by the air conditioner apparatus
56->57-2->44->66

(7) The flow of air during the indoor suction and outdoor discharge by the air conditioner apparatus
56->44->66-1->67-1->64-1

(8) The flow of air during the indoor suction and outdoor discharge by the air conditioner apparatus
56->57-1->42->64

In air flow courses (5) and (7), heat exchange is carried out between the suctioned air and the heat exchangers, and then the air is discharged through the connection channels. In air flow courses (6) and (8), on the other hand, the suctioned air passes through the connection channels, heat exchange is carried out between the air and the heat exchangers, and then the air is discharged.

In air flow course (5), outdoor air flows straight through the first suction channel 54 and the first heat exchanger 42, passes through the connection channel, and is discharged to the indoors.

In air flow course (7), outdoor air is suctioned through the first suction channel 54, passes through the connection channel, and exchanges heat with the second heat exchanger 44. The heat-exchanged air flows straight, and is then discharged to the indoors.

In air flow course (6), indoor air flows straight through the second suction channel 56 and the second heat exchanger 44, passes through the connection channel, and is discharged to the outdoors.

In air flow course (8), indoor air is suctioned through the second suction channel 56, passes through the connection channel, and exchanges heat with the first heat exchanger 42. The heat-exchanged air flows straight, and is then discharged to the outdoors.

Meanwhile, the above may be described as follows in terms of the suction channel module 50 and the discharge channel module 60.

In air flow courses (5) and (7), the suction channel module 50 is operated in the second mode, and the discharge channel module 60 is operated in the first mode.

In air flow courses (6) and (8), the suction channel module 50 is operated in the first mode, and the discharge channel module 60 is operated in the second mode.

That is, in the air conditioner apparatus according to this embodiment, the dampers of the suction channel module 50 and the discharge channel module 60 are controlled to be operated in groups in the first mode or in the second mode rather than being individually controlled.

TABLE 1

| Suction channel module | Discharge channel module | Air flow course |
|---|---|---|
| First mode | First mode | Outdoor suction and outdoor discharge/ Indoor suction and indoor discharge |
| First mode | Second mode | Outdoor suction and indoor discharge/ Indoor suction and outdoor discharge |
| Second mode | First mode | Outdoor suction and indoor discharge/ Indoor suction and outdoor discharge |
| Second mode | Second mode | Outdoor suction and outdoor discharge/ Indoor suction and indoor discharge |

When the air conditioner apparatus according to this embodiment is operated in the ventilation mode, one may be selected from between the first heat exchanger 42 and the second heat exchanger 44 such that the selected heat exchanger exchanges heat with air.

For example, in order to dehumidify air supplied from the outdoors to the indoors, the first heat exchanger 42 may be operated as the evaporator in air flow course (5), and the second heat exchanger 44 may be operated as the evaporator in air flow course (6).

If the dehumidification performance of the first heat exchanger 42 is reduced after the first heat exchanger 42 is operated as the evaporator in air flow course (5), the heat pump cycle of the air conditioning unit 40 may be changed such that the second heat exchanger 44 is operated as the evaporator, and the air flow course may be changed from air flow course (5) to air flow course (6), whereby it is possible to continuously dehumidify air supplied from the outdoors to the indoors.

For humidification, on the other hand, the first heat exchanger 42 may be operated as the condenser in air flow course (5), and the second heat exchanger 44 may be operated as the condenser in air flow course (6).

As described above, the air conditioner apparatus according to this embodiment has the effect of changing the air flow course through the opening and closing operations of the dampers 58, 59, 68, and 69 such that the dehumidification or humidification of air can be continuously carried out in the ventilation mode.

Meanwhile, in this embodiment, both the suction channel module 50 and the discharge channel module 60 are configured to have a two-story structure. Unlike this embodiment, however, one selected from between the suction channel module 50 and the discharge channel module 60 may be configured to have a multi-story structure, and the other selected from between the suction channel module 50 and the discharge channel module 60 may be configured to have a single-story structure.

In addition, in this embodiment, the suction channel module 50 and the discharge channel module 60 respectively include a plurality of suction channels 54 and 56, which extends in leftward and rightward directions, and a plurality of discharge channels 64 and 66, which extends in leftward and rightward directions. Unlike this embodiment, the suction channel module 50 and the discharge channel module 60 may each include a single suction channel and a single discharge channel. In this case, the suction channel module 50 may include an outdoor suction-side suction channel module and an indoor suction-side suction channel module, and the discharge channel module 60 may include an outdoor discharge-side discharge channel module and an indoor discharge-side discharge channel module.

As is apparent from the above description, the air conditioner apparatus according to the present invention has at least one of the following effects.

First, regardless of whether air is introduced through the upper part or the lower part of the suction channel, the air exchanges heat with the heat exchanger while contacting the entire surface of the heat exchanger. Consequently, it is possible to perform heat exchange using the entire surface of the heat exchanger, irrespective of the suction area.

Second, the suction channel module and the discharge channel module have the same structure. Consequently, it is possible to easily install and repair the air conditioner apparatus.

Third, the suction channel module and the discharge channel module are operated in the first mode or in the second mode. Consequently, it is possible to execute both the circulation mode and the ventilation mode.

Fourth, the heat exchanger is installed so as to have an area greater than the sectional area of the suction channels, which are disposed one above the other.

Consequently, it is possible to maximize the heat exchange area irrespective of the suction sectional area.

Fifth, the sectional area of the heat exchanger housing is greater than that of the suction channels, which are disposed one above the other. Consequently, it is possible to reduce the flow speed of air, thereby increasing the time during which heat exchange between air and the heat exchanger is performed.

It will be apparent that, although the embodiments of the present invention have been described above with reference to the accompanying drawings, the present invention is not limited to the above-described specific embodiments, and therefore various modifications and variations can be made by those skilled in the art without departing from the gist of the appended claims. Thus, it is intended that the modifications and variations should not be understood independently of the technical spirit or prospect of the present invention. The above embodiments are therefore to be construed in all aspects as illustrative and not restrictive.

What is claimed is:

1. An air conditioner apparatus comprising:
   a suction channel module comprising:
   a suction module housing,
   a first suction channel provided in the suction module housing, the first suction channel comprising a 1-1 suction channel and a 1-2 suction channel that is disposed below the 1-1 suction channel,
   a second suction channel provided in the suction module housing, the second suction channel comprising a 2-1 suction channel and a 2-2 suction channel that is disposed below the 2-1 suction channel, and
   a suction connection channel connected to the first suction channel and the second suction channel to direct air between the first and second suction channels;
   a discharge channel module comprising:
   a discharge module housing to receive air from the suction module housing,
   a first discharge channel provided in the discharge module housing, the first discharge channel comprising a 1-1 discharge channel and a 1-2 discharge channel that is disposed below the 1-1 discharge channel,
   a second discharge channel provided in the discharge module housing, the second discharge channel comprising a 2-1 discharge channel and a 2-2 discharge channel that is disposed below the 2-1 discharge channel, and
   a discharge connection channel connected to the first discharge channel and the second discharge channel to direct air between the first and second discharge channels;
   a first heat exchanger provided between the first suction channel and the first discharge channel to exchange heat with air having passed through the first suction channel, wherein the first heat exchanger operates as one of a condenser and an evaporator and is disposed above the 1-1 suction channel and the 1-2 suction channel; and
   a second heat exchanger provided between the second suction channel and the second discharge channel to exchange heat with air having passed through the second suction channel, wherein the second heat exchanger operates as the other of the condenser and the evaporator and is disposed above the 2-1 suction channel and the 2-2 suction channel.

2. The air conditioner apparatus of claim 1, wherein the first suction channel is provided with a channel partition plate to partition the first suction channel into the 1-1 suction channel that is positioned above the channel partition plate, and the 1-2 suction channel that is positioned below the channel partition plate, and the second suction channel is provided with a channel partition plate to partition the second suction channel into the 2-1 suction channel that is positioned above the channel partition plate, and the 2-2 suction channel that is positioned below the channel partition plate.

3. The air conditioner apparatus of claim 2, wherein the suction connection channel comprises:
   a first suction connection channel connected to the 1-1 suction channel and the 2-1 suction channel; and a second suction connection channel connected to the 1-2 suction channel and the 2-2 suction channel.

4. The air conditioner apparatus of claim 3, further comprising:
a first suction damper to selectively open and close one of the first suction connection channel and the first suction channel; and
a second suction damper to selectively open and close one of the second suction connection channel and the second suction channel.

5. The air conditioner apparatus of claim 3, wherein
the first suction connection channel and the second suction connection channel are inclined with respect to a base of the suction channel module, and
the first suction connection channel and the second suction connection channel intersect each other and are positioned at least partially one above the other.

6. The air conditioner apparatus of claim 2, wherein the first heat exchanger is positioned above the 1-1 suction channel and the 1-2 suction channel, and the 1-1 suction channel and the 1-2 suction channel are positioned one above the other.

7. The air conditioner apparatus of claim 2, wherein the second heat exchanger is positioned above the 2-1 suction channel and the 2-2 suction channel, and the 2-1 suction channel and the 2-2 suction channel are positioned one above the other.

8. The air conditioner apparatus of claim 1, wherein
the first discharge channel is provided with a channel partition plate to partition the first discharge channel into the 1-1 discharge channel that is positioned above the channel partition plate, and the 1-2 discharge channel that is positioned below the channel partition plate, and
the second discharge channel is provided with a channel partition plate to partition the second discharge channel into the 2-1 discharge channel that is positioned above the channel partition plate, and the 2-2 discharge channel, that is positioned below the channel partition plate.

9. The air conditioner apparatus of claim 8, wherein the discharge connection channel comprises:
a first discharge connection channel connected to the 1-1 discharge channel and the 2-1 discharge channel; and
a second discharge connection channel connected to the 1-2 discharge channel and the 2-2 discharge channel.

10. The air conditioner apparatus of claim 9, further comprising:
a first discharge damper to selectively open and close one of the first discharge connection channel and the first discharge channel; and
a second discharge damper to selectively open and close one of the second discharge connection channel and the second discharge channel.

11. The air conditioner apparatus of claim 9, wherein
the first discharge connection channel and the second discharge connection channel are inclined with respect to a base of the discharge channel module, and
the first discharge connection channel and the second discharge connection channel intersect each other and are positioned at least partially one above the other.

12. The air conditioner apparatus of claim 1, further comprising:
a first heat exchanger housing connected to the first suction channel and the first discharge channel to direct air between the first suction channel and the first discharge channel, wherein the first heat exchanger is provided in the first heat exchanger housing.

13. The air conditioner apparatus of claim 1, further comprising:
a second heat exchanger housing connected to the second suction channel and the second discharge channel to guide air between the second suction channel and the second discharge channel, wherein
the second heat exchanger is provided in the second heat exchanger housing.

14. The air conditioner apparatus of claim 1, wherein the first suction channel, the first heat exchanger, and the first discharge channel are arranged in a line with respect to each other.

15. The air conditioner apparatus of claim 1, wherein the second suction channel, the second heat exchanger, and the second discharge channel are arranged in a line with respect to each other.

16. The air conditioner apparatus of claim 1, wherein the first heat exchanger has a larger-area than the first suction channel.

17. The air conditioner apparatus of claim 1, wherein the second heat exchanger has a larger-area than the second suction channel.

18. The air conditioner apparatus of claim 1, wherein the first suction channel is arranged to suction air that is located outdoor, the first discharge channel is arranged to discharge air to the outdoor location, the second suction channel is arranged to suction air that is located indoor, and the second discharge channel is arranged to discharge air to the indoor location.

19. An air conditioner apparatus comprising:
a suction channel module comprising:
a suction module housing,
a first suction channel provided in the suction module housing,
a second suction channel provided in the suction module housing, and
a suction connection channel connected to the first suction channel and the second suction channel to guide air between the first suction channel and the second suction channel;
a discharge channel module comprising:
a discharge module housing to receive air from the suction module housing,
a first discharge channel provided in the discharge module housing,
a second discharge channel provided in the discharge module housing, and
a discharge connection channel connected to the first discharge channel and the second discharge channel to guide air between the first discharge channel and the second discharge channel;
a first heat exchanger disposed between the first suction channel and the first discharge channel to exchange heat with air having passed through the first suction channel, wherein the first heat exchanger operates as one of a condenser and an evaporator; and
a second heat exchanger provided between the second suction channel and the second discharge channel to exchange heat with air having passed through the second suction channel, wherein the second heat exchanger operates as the other of the condenser and the evaporator, wherein
the first suction channel is provided therein with a channel partition plate to partition the first suction channel into a 1-1 suction channel that is positioned above the channel partition plate, and a 1-2 suction channel positioned below the channel partition plate, the second suction channel is provided therein with a channel partition plate to partition the second suction channel into a 2-1 suction channel that is positioned above the channel partition plate, and a 2-2 suction channel that is positioned below the channel partition plate, the suction connection channel comprises:
- a first suction connection channel connected to the 1-1 suction channel and the 2-1 suction channel, and
- a second suction connection channel connected to the 1-2 suction channel and the 2-2 suction channel, the first discharge channel is provided therein with a channel partition plate to partition the first discharge channel into a 1-1 discharge channel that is positioned above the channel partition plate, and a 1-2 discharge channel that is positioned below the channel partition plate, the second discharge channel is provided with a channel partition plate to partition the second discharge channel into a 2-1 discharge channel that is positioned above the channel partition plate, and a 2-2 discharge channel that is positioned below the channel partition plate, the discharge connection channel comprises:
- a first discharge connection channel connected to the 1-1 discharge channel and the 2-1 discharge channel, and
- a second discharge connection channel connected to the 1-2 discharge channel and the 2-2 discharge channel, the first heat exchanger is positioned above the 1-1 suction channel and the 1-2 suction channel, whereby the 1-1 suction channel and the 1-2 suction channel are positioned one above the other, and the first heat exchanger has a larger area than the first suction channel, and the second heat exchanger is positioned above the 2-1 suction channel and the 2-2 suction channel, whereby the 2-1 suction channel and the 2-2 suction channel are positioned one above the other, and the second heat exchanger has a larger area than the second suction channel.

20. The air conditioner apparatus of claim 19, wherein the first suction channel, the first heat exchanger, and the first discharge channel are arranged in a line with respect to each other, the second suction channel, the second heat exchanger, and the second discharge channel are arranged in a line with respect to each other, the first suction channel is arranged to suction air that is located outdoor, the first discharge channel is arranged to discharge air to the outdoor location, the second suction channel is arranged to suction air that is located indoor, and the second discharge channel is arranged to discharge air to the indoor location.

\* \* \* \* \*